Sept. 20, 1966   J. E. HIERS ETAL   3,273,403
WATER CONDITIONING SYSTEM
Filed June 3, 1963   10 Sheets-Sheet 1

INVENTORS.
JAMES E. HIERS
EDWARD J. TISCHLER
BY Byron, Hume, Groen & Clement
Attorneys.

Sept. 20, 1966  J. E. HIERS ETAL  3,273,403
WATER CONDITIONING SYSTEM
Filed June 3, 1963                              10 Sheets-Sheet 3 fig. 5.

INVENTORS.
JAMES E. HIERS
EDWARD J. TISCHLER
BY
Byron, Hume, Groen & Clement
Attorneys.

Sept. 20, 1966   J. E. HIERS ETAL   3,273,403
WATER CONDITIONING SYSTEM
Filed June 3, 1963   10 Sheets-Sheet 4

INVENTORS.
JAMES E. HIERS
EDWARD J. TISCHLER
BY Byron, Hume, Groen & Clement
Attorneys.

INVENTORS.
JAMES E. HIERS
EDWARD J. TISCHLER
BY Byron, Hume, Groen & Clement
Attorneys.

Sept. 20, 1966  J. E. HIERS ETAL  3,273,403
WATER CONDITIONING SYSTEM
Filed June 3, 1963  10 Sheets-Sheet 10 fig.20.

INVENTORS.
JAMES E. HIERS
EDWARD J. TISCHLER
BY
Byron, Hume, Groen & Clement
Attorneys.

United States Patent Office 3,273,403
Patented Sept. 20, 1966

3,273,403
WATER CONDITIONING SYSTEM
James E. Hiers and Edward J. Tischler, St. Paul, Minn.,
assignors to Union Tank Car Company, Chicago, Ill.,
a corporation of New Jersey
Filed June 3, 1963, Ser. No. 285,117
22 Claims. (Cl. 74—2)

This invention relates to a timing device. It deals more particularly with a timing device for a water conditioning system.

It is an object of this invention to provide a new and improved timing device.

It is another object to provide a new and improved timing device for controlling service and regeneration in a water conditioning system.

It is still another object to provide an improved timing device, for a water conditioning system, which facilitates simple and expeditious time and day set for regeneration initiation.

It is yet another object to provide a new and improved timing device for a water conditioning system, which facilitates readily varying the length of the backwash cycle of regeneration.

It is a further object to provide a new and improved timing device, the timing element of which also serves as the power source for operating the device.

It is yet a further object to provide a new and improved timing device which facilitates easily initiating regeneration at any time at the discretion of the operating personnel.

The foregoing and other objects are realized in accordance with the present invention by providing a new and improved timing device for controlling service and regeneration in a water conditioning ssytem. The timing device controls a valve arrangement according to a predetermined schedule, the valve arrangement responding to control the flow of service water, recharge brine, and backwash water through a conventional water softener tank. The timing device is basically a mechanical construction, powered by electrical motor means which also introduces the timing element into the device. The mechanical construction is simple and extremely durable, yet is so sophisticated as to permit a wide range of time and day settings for regeneration, as well as variation of the length of the backwash cycle, all with a minimum of effort.

The invention, both as to its organization and method of operation, taken with further objects and advantages thereof, will best be understood by reference to the following description taken in connection with the accompanying drawings, in which.

Figures 1, 2:
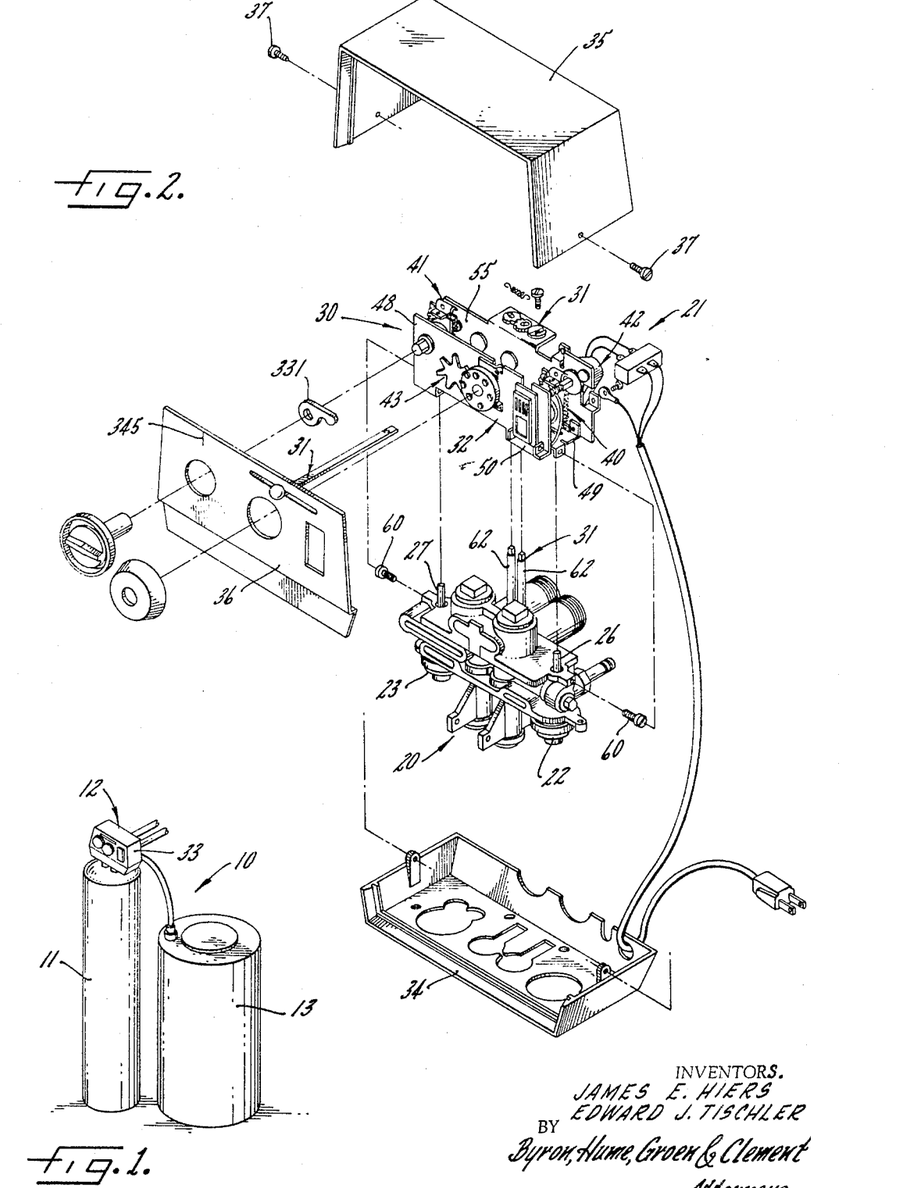
FIGURE 1 is a perspective view of a water conditioning system incorporating a timing device embodying features of the present invention.
FIGURE 2 is an enlarged exploded perspective view of a control unit containing the timing device.

Referring now to the drawings, and particularly to FIGURE 1, a broadly conventional water conditioning system is illustrated generally at 10. The system 10 includes a water softening tank 11 and a regeneration system 12 for supplying and controlling the flow of brine through the tank 11 according to well known practice, and subsequently backwashing the contents (not shown) of the tank 11 with fresh water to remove residual brine. The regeneration system 12 is broadly of the type illustrated and described in the co-pending application of B. H. Kryzer, entitled "Multiple Flow Valve Control for Liquid Treatment Apparatus," Serial No. 190,995, filed April 30, 1962 now Patent No. 3,215,273.

Although the present invention is concerned primarily with timing the recharge and backwash cycles of the regeneration system 12, a brief explanation of the operation of the entire system 12, in relation to the water softening tank 11, is in order. As is well known, a broadly conventional water softening tank 11 normally contains a bed of ion exchange resins (not shown) which remove hardness from the water in the form of calcium and magnesium ions and the like.

The resins accomplish this end by taking calcium and magnesium ions from the water and replacing these ions with sodium ions or the like. As the resins accumulate more and more calcium and magnesium ions they become less effective as softening agents and regeneration of the resins is in order.

Regenerating ion exchange resins normally involves passing a brine solution through the resin bed, flowing in reverse direction to that which the water would normally flow, to "pick-off" hardness inducing ions such as calcium and magnesium from the resins and replace them once more with sodium ions. The brine containing calcium and magnesium in solution is shunted to a drain.

The regeneration system 12 is set up to cyclically effect regeneration flow of brine followed by backwashing flow of fresh water, as has been pointed out. It is the timing of this cycle, including its presetting and selective variation, with which the present invention is primarily concerned. Broadly speaking, at a predetermined time on a given day or days in the week, the regeneration system 12 shuts off the flow of fresh water through the water softening tank 11 and initiates reverse flow of brine from its brine tank 13 through the ion exchange bed (not shown) in the tank 11 and out to a drain. After a predetermined period of time, usually in the neighborhood of one hour or the like, the ion exchange resin bed is considered satisfactorily regenerated. The flow of brine through the tank 11 is automatically halted and a reverse flow of fresh water through the tank is initiated. This flow of fresh water in reverse direction through the tank 11 "backwashes" residual brine and other foreign matter out of the tank 11 to a drain. After a predetermined backwash period, the regeneration system 12 acts to stop the backwash flow of fresh water through the tank and into the household system, for example.

Referring now to FIGURE 2, a valve unit 20 broadly of the type illustrated and described in the aforementioned Kryzer application physically controls the normal flow of fresh water through the water softening tank 11, the regeneration reverse flow of brine from the tank 13 through the water softening tank 11 to a drain, and the backwash reverse flow of fresh water through the tank 11 to a drain. A control unit 21 is effective, according to the present invention, to sequently open and close a diaphragm type drain valve 22 and a diaphragm type rinse valve 23 of the valve unit 20 at a predetermined time on a predetermined day or days, and correspondingly permit normal flow of fresh water through the tank 11, and initiate and stop regeneration and backwash flow of brine and fresh water, respectively, through the tank 11.

To successfully effect regeneration, including brine recharge and backwash, with a valve unit 20 broadly of the type illustrated and described in detail in the aforementioned Kryzer application, the drain valve 22 must first be opened to halt the raw water flow through the tank and initiate reverse flow of brine through the tank 11 from the brine tank 13 to a drain. After a predetermined regeneration period, the rinse valve 23 is opened and initiates backwash flow of raw water through the tank 11 to the drain. After a predetermined backwash period, the drain valve 22 is closed to pre-empt operation of the rinse valve 23 and once more initiate raw water flow directly through the tank 11. At some chosen time subsequent to the closing of the drain valve 22, the rinse valve 23 is closed.

Turning now to the present invention and still referring to FIGURE 2, the control unit 21 selectively opens the drain valve 22 and the rinse valve 23 in a prescribed sequence by mechanically depressing a drain valve pin 26 and a rinse valve pin 27, respectively. The valves 22 and 23 are slightly different than those utilized in the aforementioned Kryzer application, which disclose solenoid type valves. However, the functional results are the same and for purposes of reference the operation of the valves can be considered identical. The drain valve pin 26 and the rinse valve pin 27 are conventionally spring loaded to a valve closed position and their respective valves 22 and 23 pop closed when the control unit 21 releases them.

The control unit 21 includes a valve sequence time operator 30 which embodies features of the present invention, and a manual bypass valve operator 31 mounted in a chassis 32. The chassis 32 is mounted on the valve unit 20 and the entire valve unit 20 and the control unit 21 are enclosed in a housing 33 which is appropriately mounted on the top of the water softening tank 11. The housing 33 comprises a base 34 and a cover 35 nested over a face plate 36. Machine screws 37 hold the housing together.

The manual bypass operator 31 is a separate and independent device and forms no part of the present application. Accordingly it is not discussed here in detail. Briefly, however, the bypass valve operator 31 is effective to bypass fresh water directly into the household system, for example, without passing through the softening tank 11. This might be desirable when watering a lawn, for example, since soft water is not required and the softener need not be in operation.

Figure 3:
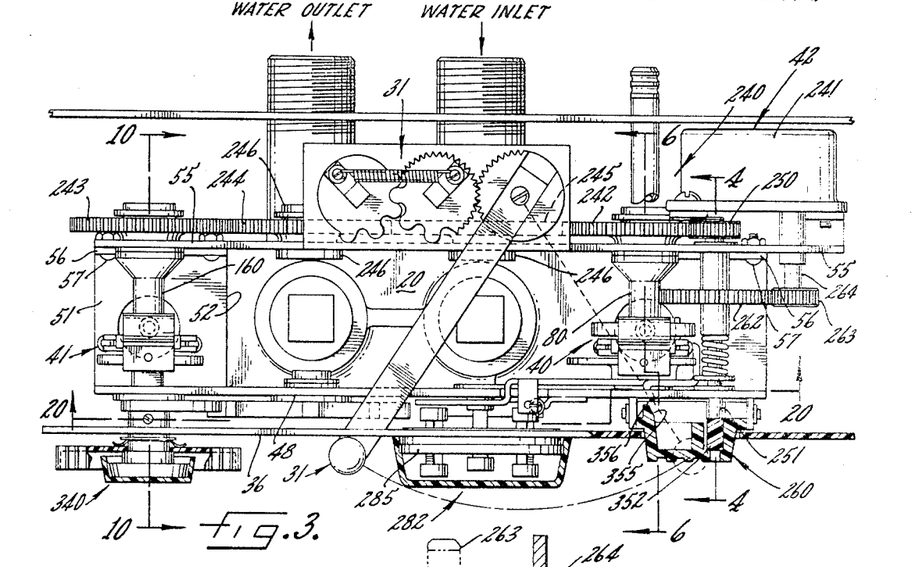
FIGURE 3 is a further enlarged top plan view, partially in section of the control unit including the timing device.

Referring now to FIGURES 2 and 3, components of the valve sequence time operator 30 which are mounted in the chassis 32 according to the present invention include a drain valve actuator assembly 40 for mechanically controlling the drain valve 22, a rinse valve actuator assembly 41 for mechanically controlling the rinse valve 23, a power and drive train assembly 42 for driving the immediately aforementioned actuator assemblies 40 and 41, and a time and day set assembly 43 for appropriately presetting the time and day or days upon which the valves 22 and 23 will be actuated by their respective actuator assemblies 40 and 41.

The chassis 32 includes a front wall 48 and a floor 49 defined by a one piece, L-shaped metal plate 50. The floor 49 actually is in two pieces, and is composed of legs 51 extending from opposite ends of the front wall 48 and defining an open space 52 therebetween (see FIGURE 3). A metallic plate rear wall 55 is secured to upwardly bent flanges 56 on the legs 51 by conventional machine screws 57 or the like.

Mounted on the extending between the front wall 48 and the rear wall 55 of the chassis 32 are the drain valve actuator assembly 40 and the rinse valve actuator assembly 41. The power and drive train assembly 42 is also mounted on and extends between the front wall 48 and the rear wall 55 (as well as along behind the rear wall 55) and is adapted to be selectively operatively connected to the actuator assemblies 40 and 41 to drive and control them or, alternatively, disconnected from the actuator assemblies 40 and 41 to permit appropriate pre-setting thereof through the medium of the time and day set assembly 43 so that the drain valve 22 and the rinse valve 23 are actuated at a predetermined time on a predetermined day or days. The time and day set assembly 43 is disposed along the front wall 48 of the chassis 32.

The chassis 32 is seated on top of the valve unit 20 and secured thereto by conventional machine screws 60. In this relationship the drain valve pin 26 and the rinse valve pin 27 extend upwardly through appropriately formed apertures 61 in the chassis legs 51 into operative relationship with the drain valve actuator assembly 40 and the rinse valve actuator assembly 41, respectively (see FIGURES 3 and 4). The vertically disposed rods 62 which extend into the chassis 32 from the value unit 20 form components of the aforementioned manual bypass valve operator 31 and, accordingly, are referred to only in passing.

The drain valve actuator assembly 40 is effective to depress the drain valve pin 26 against the bias of a return spring (not shown) at a predetermined time on a given day or days of the week to open the drain valve 22 and initiate regeneration of the water softener 11. The drain valve actuator assembly maintains the pin 26 in depressed relationship for a predetermined period of time equal to the total time desired for brine recharge usually an hour, as has been pointed out, plus the time desired for backwash of the resin bed within the tank 11, usually ten to forty minutes. After this predetermined period of time, which might be varied within prescribed limits according to the persent invention to lengthen or shorten backwash time, the drain valve actuator assembly 40 releases the drain valve pin 26 which, in turn, allows the drain valve 22 to close and throw the water softener system 10 back into normal operation wherein raw water passes into the water softener tank 11 and through to the household water system as soft water.

The rinse valve actuator assembly 41 is directly connected to the drain valve actuator assembly 40 through the power and drive train assembly 42 and, accordingly, operates in phase with the drain valve actuator assembly 40. One hour after the drain valve actuator assembly 40 has opened the drain valve 22, the rinse valve actuator assembly 41 is effective to depress the rinse valve pin 27 and open the rinse valve 23. Opening the rinse valve 23 initiates flow of raw water through the water softener tank 11 to rinse out residual brine and other foreign matter from the ion exchange resin bed and, simultaneously causes the regeneration flow of brine through the tank 11 to cease. While both the drain valve 22 and the rinse valve 23 are open then, and before the drain valve actuator assembly 40 closes the drain valve 22, backwash of the water softener tank 11 continues to take place. In this regard, as has previously been pointed out in relation to the operation of the drain valve actuator assembly 40, once it is effective to close the drain valve 22 backwash ceases even though the rinse valve 23 remains open.

The rinse valve actuator assembly 41 is so phased relative to the drain valve actuator assembly 40 that it releases the rinse valve 23 a short time after the drain valve actuator assembly 40 releases the drain valve 22 and, accordingly, the rinse valve 23 closes. The regeneration system 12 is then at rest until a predetermined time on the next pre-set day is reached and regeneration and backwash occur once more in the manner described. The time and day control assembly 43 controls this setting or settings according to the present invention.

Referring especially to FIGURES 3, 4, and 6-8, the drain valve actuator assembly 40 includes a drain shaft 80 journaled in a suitable manner between a bearing 81 in the front wall 48 of the chassis 32 and a bearing 82 in the rear wall 55 of the chassis. A rear extension 83 of the shaft 80 protrudes through the rear wall 55 into operational engagement with the power and drive train assembly 42 hereinbefore referred to and hereinafter discussed in detail. The shaft 80 is rotated counter clockwise in the bearings 81, 82, by the power and drive train assembly 42 at a speed corresponding to one revolution per day, according to the present invention.

Figures 7, 9:
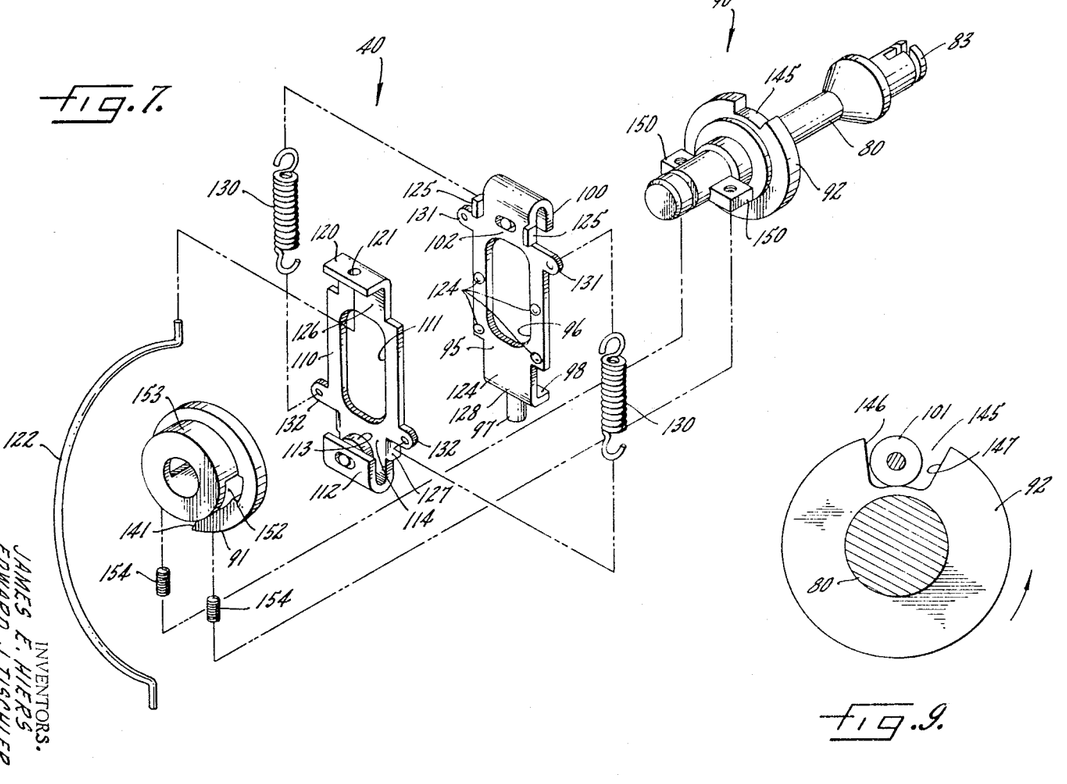
FIGURE 7 is an enlarged exploded perspective view of the drain shaft assembly incorporated in the timing device.
FIGURE 9 is a sectional view taken along line 9—9 of FIGURE 6.

Mounted on the drain shaft 80 and movable transversely thereof is the drain valve actuator sub-assembly 90 which is effective to depress and release the drain valve pin 26 and, accordingly, open and close the drain valve 22. An energizer cam 91 and an actuator cam 92 mounted on the shaft 80, for rotation with it, bracket the sub-assembly 90 and cooperate therewith according to the present invention to induce the actuator sub-assembly 90 to depress and release the drain valve pin 26.

The drain valve actuator sub-assembly 90 includes a vertically disposed actuator plate 95 mounted on the shaft 80 immediately adjacent the actuator cam 92 for movement transversely of the shaft. The plate 95 is generally flat, as will be noted, and contains an elongated aperture 96 through which the shaft 80 extends. A pin 97 extends downwardly from the foot 98 of the plate 95 and is adapted to cooperate with the drain valve pin 26 associated with the drain valve 22. The pin 97 preferably has a tubular recess 99 formed in its lower end to telescope over the drain valve pin 26 and maintain the pins 26 and 97 in lost motion relationship. The upper end of the actuator plate 95 is bent downwardly, as at 100, and a cam roller 101 is loosely mounted for rotation between the body 102 of the plate 95 and the downwardly extending upper end 100 thereof. The cam roller 101 cooperates with the actuator cam 92 according to the present invention to control the vertical position of the actuator plate 95 relative to the shaft 80 and, accordingly, as will hereinafter be discussed in detail, the actuation of the drain valve 22.

The actuator sub-assembly 90 also includes a return plate 110 which is identical in construction and arrangement to the actuator plate 95, albeit inverted insofar as its mounting on the shaft 80 is concerned. The plate 110 includes an elongated aperture 111 through which the shaft 80 extends, and an upwardly turned lower end 112. A cam roller 113 is loosely journaled between the upwardly turned lower end 112 and the body 114 of the plate 110. The cam roller 113 cooperates with the energizer cam 91 in in accordance iwth the present invention to control the vertical position of the plate 110 and, accordingly, as will hereinafter be discussed in detail, preconditioned actuation of the drain valve 22 as well as control deactuation thereof.

The upper end of the return plate 110 carries a perpendicularly extending foot 120 having an aperture 121 formed therein for receiving the upper end of an irregularly shaped compression spring member 122. The lower end of the spring member 122 is seated on the chassis 32 adjacent the juncture of the corresponding leg 51 and the front wall 48 so that the spring member 122 is in compression. The return spring member 122 constantly urges the actuator sub-assembly 92 to retract from operative engagement with the drain valve pin 26 and, accordingly, permit the drain valve 22 to close.

The plates 95 and 110 are slideable against each other on appropriately formed dimples 124 (see FIGURE 7) on the plate 95 and guided in their relative slideable movement by fingers 125 on the plate 95 bracketing the neck 126 of the plate 110, and fingers 127 on the plate 110 bracketing the neck 128 on the plate 95. The plates 95 and 110 are urged in opposite directions; that is, the actuator plate 95 is urged downwardly and the return plate 110 correspondingly urged upwardly by coil springs 130 disposed between ears 131 and 132 formed on the plates 95 and 110, respectively. The fingers 125 and 127 serve to limit relative movement of the plates in the opposite direction. Rotation of the plates 95 and 110 with the shaft 80 is prevented by cooperation between the pins 26 and 97.

It has already been pointed out that the return plate 110 is urged upwardly by the spring member 122. Accordingly, the actuator plate 95, which is connected to the return plate 110 by the coil springs 130, is also urged upwardly. The normal tendency of the actuator plate sub-assembly 90 then, without considering the effect of the energizer cam 91 and the actuator cam 92, is to be urged out of operative engagement with the drain valve pin 26, permitting the drain valve 22 to remain closed.

As the energizing cam 91 rotates with the drain shaft 80 relative to the actuator sub-assembly 90, however, it urges the return plate 110 downwardly against the bias of the return spring member 122. The energizer cam 91, as seen in FIGURE 7, is so constructed that the return plate 110 is urged slowly downwardly against the bias of the return spring member 122, as the cam roller 113 moves from a low point 140 on the cam 91 adjacent the drop off 141 thereon toward a high point 142 immediately adjacent the low point 140 on the opposite side of the drop off. While the return plate 110 is driven downwardly, however, the actuator plate 95 is retained in a transversely fixed position relative to the drain shaft 80 by the actuator cam 92. Accordingly, as energy is built up in the return spring 122 by compression, it is simultaneously built up in the coil springs 130 by distension.

To understand the significance of the foregoing arrangement, of course, the relationship of the cam 92 to sub-assembly 90 must be understood. The actuator cam 92 is substantially circular with the exception of a cutout 145 formed in its periphery. The cam 92 is positioned on the shaft 80 so that the cutout's leading edge 146, which lies on a chord of the circle defined by the cam 92, reaches the cam roller 101 on the actuator plate 95 at precisely X minutes before the drop off 141 on the energizer cam 91 reaches the cam roller 113 and, accordingly, permits the return plate 110 to be driven upwardly by the return spring member 122.

The X minute time period is the total period of time required for brine recharge and backwash, of course. In this case, the X minute period is equal to sixty minutes plus anywhere from ten to forty minutes, depending upon the desired length of backwash cycle as pre-set according to the present invention. As the cam roller 101 falls into the cutout 145 on the actuator cam 92, the stored energy in coil springs 130 drives the actuator plate 95 and, consequently, the drain valve pin 26 downwardly to open the drain valve 22.

The cutout 145 in the circular periphery of the actuator cam 92 is of such length that more than the aforementioned X minute period passes before the cam roller 101 reaches the cutout's trailing edge 147, which lies on a radius of the circle defined by the cam. Accordingly, the drain valve 22 is held open by actuator plate 95 for the total X mniute period without interruption. When X minutes pass the cam roller 113 on the return plate 110 falls from the drop off 141 on the energizer cam 91 and the entire actuator sub-assembly 90 rises under the influence of the return spring member 122 and permits the drain valve 22 to close.

The period during which time the drain valve 22 is maintained in open relationship, X minutes for purposes of description, encompasses both the brine recharge period and the backwash period, as previously pointed out. The first or recharge portion of this X minute period is preferably one hour, as also pointed out, while the latter portion of the X minute period is devoted to the backwash cycle. The backwash cycle can be said to be initiated when the rinse valve 23 is opened by the rinse valve actuator assembly 41 while the drain valve 22 is still open, the rinse valve actuator assembly 41 operating in phase with the drain valve actuator assembly 40.

Figure 8:
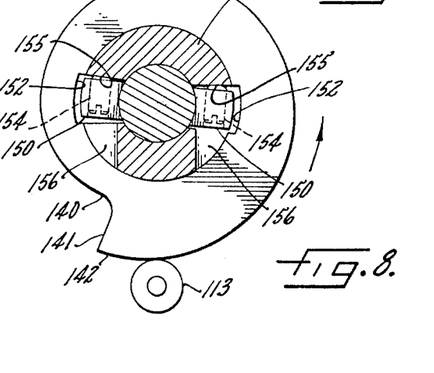
FIGURE 8 is a sectional view taken along line 8—8 of FIGURE 6.
Figure 10:
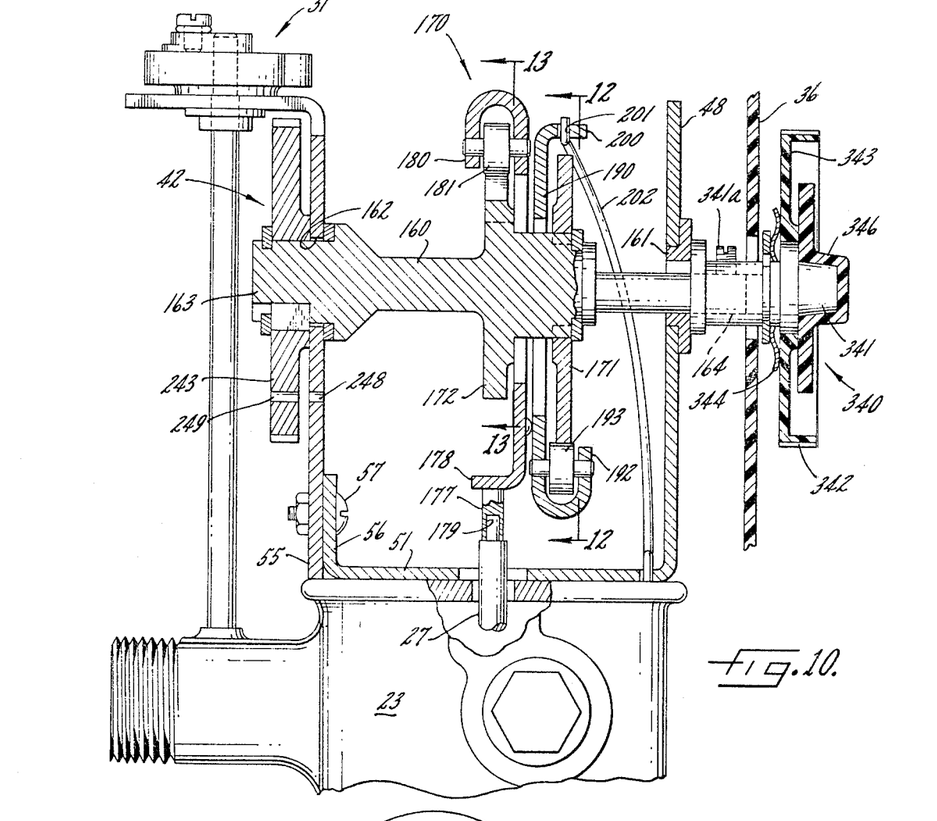
FIGURE 10 is a sectional view taken along line 10—10 of FIGURE 3.

Returning for a moment to the drain valve actuator assembly 40, however, it is so constructed and arranged that the length of the backwash cycle can be varied, as has also been pointed out. Referring to FIGURES 7 and 8, a pair of ears 150 extend in opposite directions from the shaft 80 into slightly wedged shaped cutouts 152 defined in a collar 153 formed unitarily with the energizer cam 91. The ears 150 carry set screws 154 therein which extend into engagement with corresponding inclined faces 155 of the cutouts 152. By suitably adjusting the set screws 154, through the access passages 156 in the collar 153, the cam 91 can be angularly adjusted on the shaft 80 and, accordingly, the angular relationship of the drop off 141 to the leading edge 146 in the actuator cam cutout 145 can be varied within prescribed limits. Adjustability is preferably permissible over a range of about seven-and-a-half degrees, or thirty minutes, considering that the shaft rotates through 360 degrees in 24 hours. Since it is desirable that a minimum backwash period of ten minutes be permitted, the maximum X minute period for recharge and backwash is set at about one hundred minutes. Accordingly, understanding that the recharge period is preferably a fixed sixty minute period, the variable backwash period can be adjusted between ten and forty minutes, depending upon the setting of the energizer cam 91 on the drain shaft 80.

Turning now to the rinse valve actuator assembly 41 and referring to FIGURES 10–13, the assembly 41 includes a rinse shaft 160 journaled in a suitable manner between a bearing 161 in the front wall 48 of the chassis 32 and a bearing 162 in the rear wall 55 of the chassis. A rear extension 163 of the shaft 160 protrudes through the rear wall 55 into operative engagement with the power and drive train assembly 42. A front extension 164 of the shaft 160 protrudes through the front wall 48 into operative relationship with the time and date set assembly 43. The drain shaft 80 and the rinse shaft 160 rotate at the same speed, or in phase, but the rinse shaft 160 rotates in a clockwise direction in contrast to the drain shaft 80.

Figure 11:
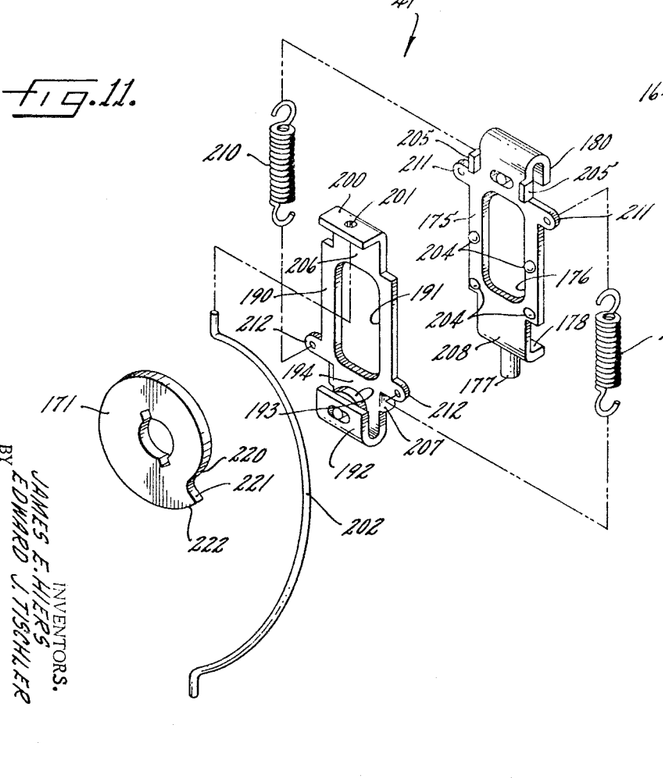
FIGURE 11 is an enlarged exploded perspective view of the rinse shaft assembly incorporated in the timing device.
Figure 12:
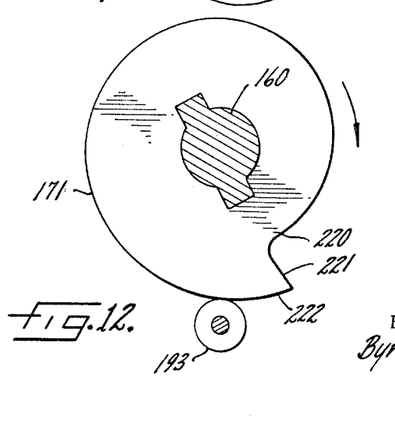
FIGURE 12 is a sectional view taken along line 12—12 of FIGURE 10.
Figure 13:
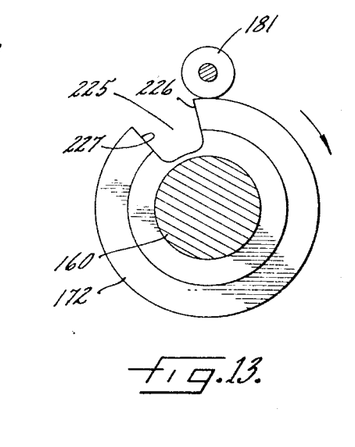
FIGURE 13 is a sectional view taken along line 13—13 of FIGURE 10.
Figure 14:
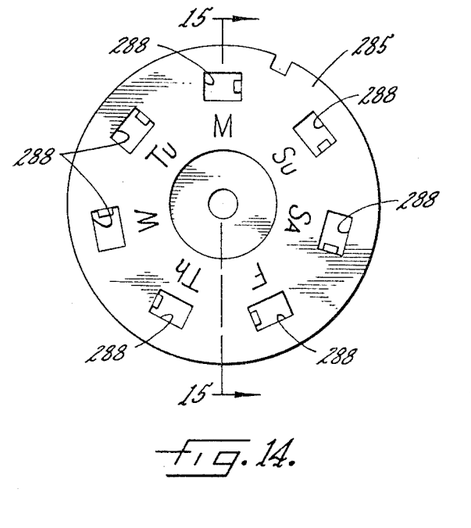
FIGURE 14 is a front-elevational view of the day set dial for the timing device.
Figure 15:
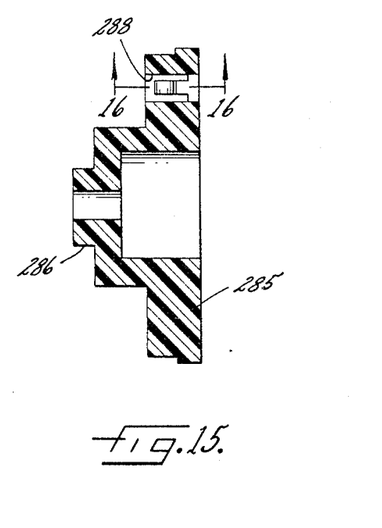
FIGURE 15 is a sectional view taken along line 15—15 of FIGURE 14.
Figure 16:
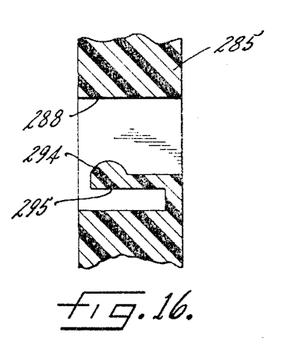
FIGURE 16 is an enlarged sectional view taken along line 16—16 of FIGURE 15.

Mounted on the rinse shaft 160 and moveable transversely thereof is the rinse valve actuator sub-assembly 170 which is effective to depress and release the rinse valve pin 27 and, accordingly, open and permit closure of the rinse valve 23 in a manner substantially identical to the manner in which the drain valve actuator sub-assembly manipulates the drain valve 22. An energizer cam 171 and an actuator cam 172 mounted on the shaft 160, for rotation with it bracket the actuator sub-assembly 170 and cooperate therewith according to the present invention to induce the actuator sub-assembly 170 to depress and release the rinse valve pin 27.

The rinse valve actuator sub-assembly 170 includes a vertically disposed actuator plate, 175 mounted on the shaft 160 immediately adjacent the actuator cam 172 for movement transversely of the shaft. The plate 175 is identical to the plate 95 of the drain valve actuator assembly 40 and, as such, contains an elongated aperture 176 through which the shaft 160 extends. A pin 177 extends downwardly from the foot 178 of the plate 175 and is adapted to cooperate with the rinse valve pin 27 associated with the rinse valve 23. A tubular recess 179 in the lower end of the pin 177 permits it to telescope over the rinse valve pin 27 and maintain the pins 27 and 177 in lost motion relationship. The upper end of the actuator plate 175 is bent downwardly, as at 180, and a cam roller 181 is loosely mounted for rotation between the body 182 of the plate 175 and the downwardly extending upper end 180 thereof. The cam roller 181 cooperates with the actuator cam 172 according to the present invention to control the vertical position of the actuator plate 175 and, accordingly, as hereinafter discussed in detail, control the rinse valve 23.

The rinse valve actuator sub-assembly 170 includes a return plate 190 which is substantially identical to the return plate 110 of the drain valve actuator sub-assembly 90. The plate 190 contains an elongated aperture 191 through which the shaft 160 extends and an upwardly turned lower end 192. A cam roller 193 is loosely journaled between the upwardly turned lower end 192 and the body 194 of the plate 190. The cam roller 193 cooperates with the energizer cam 171 to vary the vertical position of the return plate 190 and precondition the actuation of the rinse valve 23 as well as control the deactuation thereof.

The upper end of the return plate 190 carries a perpendicularly extending foot 200 having an aperture 201 formed therein for receiving one end of an irregularly shaped compression spring member 202. The other end of the spring member 202 is seated on the chassis 32 at the juncture of the corresponding leg 51 and front wall 48 so that the spring member is in compression. The spring member 202 continually urges the actuator assembly 174 to move out of operative engagement with the rinse valve pin 27 wherein the rinse valve 23 is permitted to close.

In a manner similar to the drain valve actuator assembly 40, the plates 175 and 190 of the rinse valve actuator 41 are slideable against each other on appropriately formed dimples 204 on the plate 175 and guided in their relative slideable movement by fingers 205 on the plate 175 bracketing the neck 206 on the plate 190, and fingers 207 on the plate 190 bracketing the neck 208 on the plate 175. The plate 175 is urged downwardly and the return plate 190 correspondingly upwardly by coil springs 210 disposed between ears 211 and 212 formed on the plates 175 and 190, respectively. Similarly to the assembly 40, the fingers 205 and 207 act as stop means for relative movement of the plates 175 and 190 in the opposite direction. Since the return plate 190 is urged upwardly by the spring member 202 the actuator plate 175 is also urged upwardly, being connected to the return plate 190 through the coil springs 210.

As the energizer cam 171 rotates with the shaft 160 relative to the actuator sub-assembly 170, it urges the return plate 190 downwardly against the bias of the compression spring member 202. While the return plate 190 is driven downwardly the actuator plate 175 is retained in a transversely fixed position relative to the rinse shaft 160 by the actuator cam 172. Accordingly, the plates 175 and 190 are slowly urged further apart as the cam 171 rotates from a low point 20 adjacent a drop off 221 on the cam 171 toward a high point 222 on the opposite side of the drop off 221. The spring member 202 is compressed as the coil springs 210 are distended.

As with corresponding components of the drain valve actuator assembly 40, the relationship of the actuator cam 172 to the actuator sub-assembly 170 must be understood to appreciate the significance of the aforedescribed arrangement. It will be seen that the actuator cam 172 is substantially circular with the exception of a cutout 225 formed in its periphery. The cam 172 is angularly pre-positioned on the shaft 160 so that the cutout's leading edge 226, which lies on a chord of the generally circular periphery of the cam 172, reaches the cam roller 181 of the actuator plate 175 sixty minutes after the drain valve 22 is opened by the drain valve actuator assembly 40 in the manner hereinbefore discussed. The sixty-minute period has arbitrarily been chosen for a recharge period and it might be varied in practice. As the cam roller 181 falls into the cutout 225 on the actuator cam 172, the distended coil springs 210 drive the actuator plate 175 and consequently the rinse valve pin 27 downwardly to open the rinse valve 23.

With the rinse valve 23 and the drain valve 22 open, the regeneration system 12 begins the backwash cycle. It remains in this cycle until the drain valve actuator assembly 40 is effective to permit the drain valve 22 to close. After an additional arbitrarily predetermined short period of time (between five and thirty-five minutes, depending upon the length of the backwash period adjustably set up in the drain valve actuator assembly 40) the cam roller 193 on the return plate 190 reaches and falls off the drop off 221 on the energizer cam 171. The compressed spring member 202 is released and, accordingly, moves the entire actuator sub-assembly 170 upwardly, releasing the rinse valve pin 27 and permitting the rinse valve 23 to close. The cutout 225 is long enough so that the spring member 202 forces the sub-assembly 170 upwardly in the foregoing manner to release the rinse valve pin 27 before the cam roller 181 reaches the trailing edge 227 of the cutout 225, which trailing edge lies on a radius of the circular cam 172.

Since the drain shaft 80 and the rinse shaft 160 are rotated precisely in phase at all times by the power and drive train assembly 42, carefully pre-setting the relative angular relationships between the actuator cams 92 and 172 and the energizer cams 91 and 171 establishes a prescribed cyclical operation of the valve unit 20. The relationship is subsequently variable to the extent that the length of the backwash cycle can be varied. By manipulating the angular relationship of the energizer cam 91 on the drain shaft 80, its angular relationship to actuator cam 172 on the rinse shaft 160 is also varied, shortening or lengthening the time which the drain valve 22 stays open after the rinse valve 23 opens. The time during which both valves 22 and 23 are open is backwash time, of course.

Figure 4:
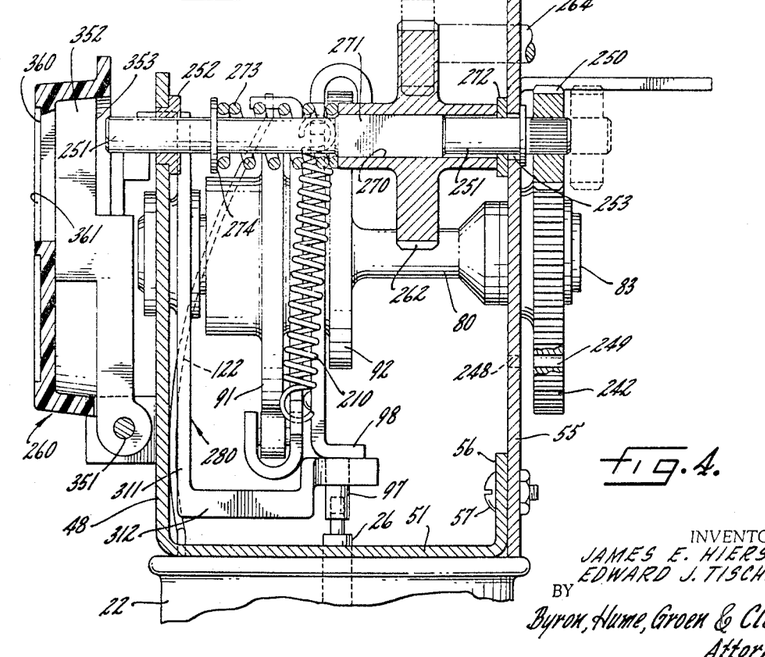
FIGURE 4 is a sectional view taken along line 4—4 of FIGURE 3.

Referring now to FIGURES 3 and 4, the power and drive train assembly 42, which rotates the drain shaft 80 and the rinse shaft 160 in opposite directions at one revolution per day, includes a gear train 240 normally connecting the shafts 80 and 160 to a timing motor 241. The gear train 240 comprises a pair of 96 tooth spur gears 242 and 243 mounted on the rear extensions 83 and 163 of the shafts 80 and 160, respectively. Meshing identical idler gears 244 and 245 journaled on stub shafts 246 mounted on the rear wall 55 of the chassis 32 interconnect the spur gears 242 and 243. It should be pointed out here that before the idler gears 244 and 245 are introduced between the spur gears 242 and 243, the spur gears are aligned angularly in their prescribed phase relationship by aligning holes 248 and 249 in the back wall 55 and gears 242 and 243, respectively.

The gear train 240 further includes a 16-tooth gear 250 mounted on the rear end of a clutch shaft 251 rotatably journaled in bearings 252 and 253 suitably supported by the front and rear walls 48 and 55, respectively, of the chassis 32. The shaft 251 is axially slidable in the bearings 48 and 55, as well as being rotatable therein, to permit the gear 250 to be moved out of mesh with the 96-tooth spur gear 242 on the shaft 80 by driving the clutch shaft 251 rearwardly with a disengaging plate unit 260 pivotally mounted on the front wall 48 of the chassis 32.

A sixty-four tooth gear 262 is fixed for rotation with, but axially slidable on, the clutch shaft 251 within the confines of the chassis 32 and is always in mesh with a sixteen-tooth gear 263 mounted on the output shaft 264 of the motor 241. The motor 241 rotates the shaft 264 at a constant one-sixteenth r.p.m., or one revolution per hour. Accordingly, the clutch shaft 251 is rotated at one revolution every four hours and, in turn, the drain shaft 80 and the rinse shaft 160 are rotated at the aforementioned one revolution every twenty-four hours. The motor 241 thus serves as both a power source and a timing means for the control unit 21.

As pointed out above, the clutch shaft 251 is slideable in its supporting bearings 252 and 253 to move the gear 250 out of mesh with the spur gear 242 and disengage the motor 24 from connection with the drain shaft 80 and the rinse shaft 160. The drain shaft 80 and the rinse shaft 160 must be freed for rotation independent of the motor 241 when it is desirable to pre-set the time and day or days selected for regeneration and backwash to occur. The gear 262 is rotatably fixed and slideably mounted on the shaft 251 through the medium of square mounting passage 270 in the gear on its axis of rotation and a complimentary square section 271 of predetermined length on the shaft 251. The gear 262 rotates against a beam 272 on the rear wall 55 of the chassis 32 which prevents it from sliding rearwardly out of mesh with the drive gear 263. A coil spring 273 encircling the clutch shaft 251 between the gear 262 and a collar 274 on the shaft 251 prevents the gear 262 from moving forward out of mesh and biases the shaft 251 forwardly so that its front end 275 extends into immediately adjacent relationship with the disengaging plate unit 260. The sixteen-tooth gear 250 on the gear end of the shaft 251 is normally in mesh with the spur gear 242 on the rinse shaft 80.

When it is desirable to pre-set an appropriate time and day for operation of the regeneration system 12, the disengaging plate unit 260 is pivoted toward the chassis wall 48 position, forcing the clutch shaft 251 rearwardly and disengaging the sixteen-tooth gear 250 from the spur gear 242. The time and day set assembly 43 is then manipulated in the manner hereinafter discussed to pre-set the time and day or days when the control unit 21 will cause the water conditioning system 10 to go into regeneration.

The broad concept of day set according to the present invention is relatively simple. The drain valve actuator assembly 40 and the rinse valve actuator assembly 41 normally seek to cyclically open and permit closure of the drain valve 22 and the rinse valve 23, respectively, once during each successive 24 hour period. Since it is considered desirable to cycle regeneration on only a few days of the week in a normal residential system, the time and day set assembly 43 is effective to prevent opening of the drain valve 22 except on those days which are preselected. The valve unit 20 is constructed, of course, so that the rinse valve 23 can be cycled open and closed as many times as desired without affecting the operation of the regeneration system 12, as long as the drain valve 22 is not opened.

Figure 19:
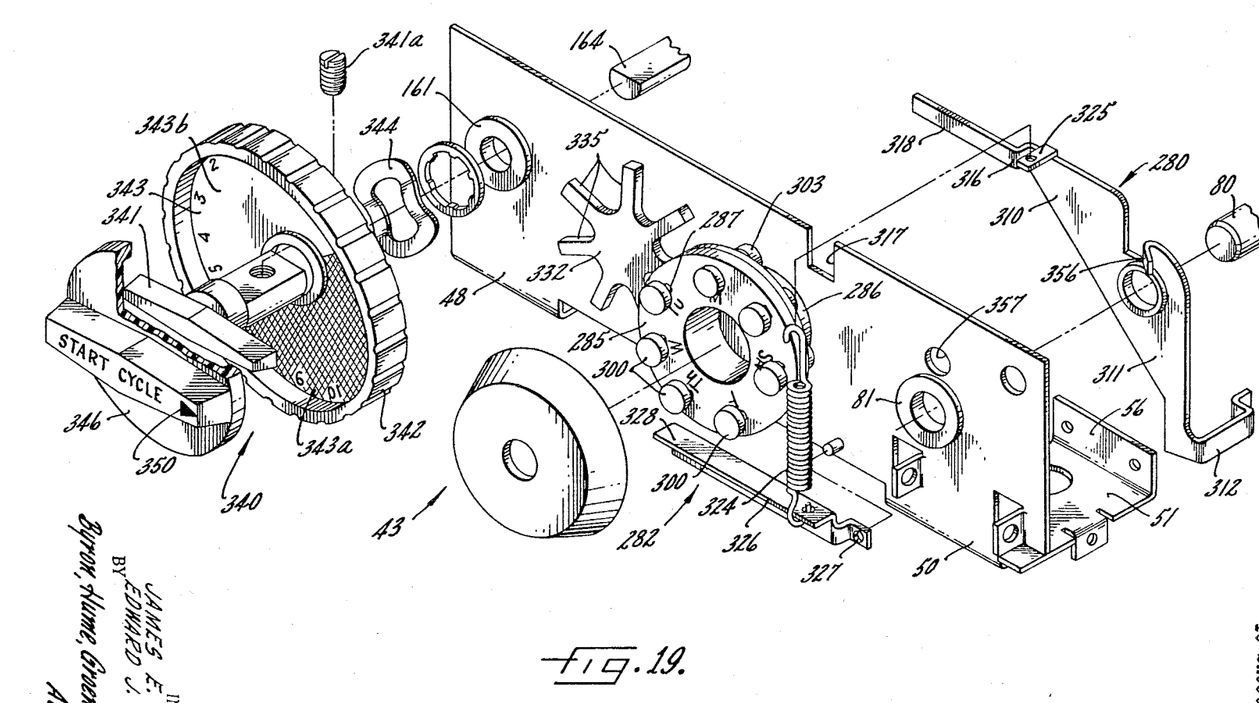
FIGURE 19 is an exploded perspective view of the time and day set assembly including the day set dial.
Figure 20:
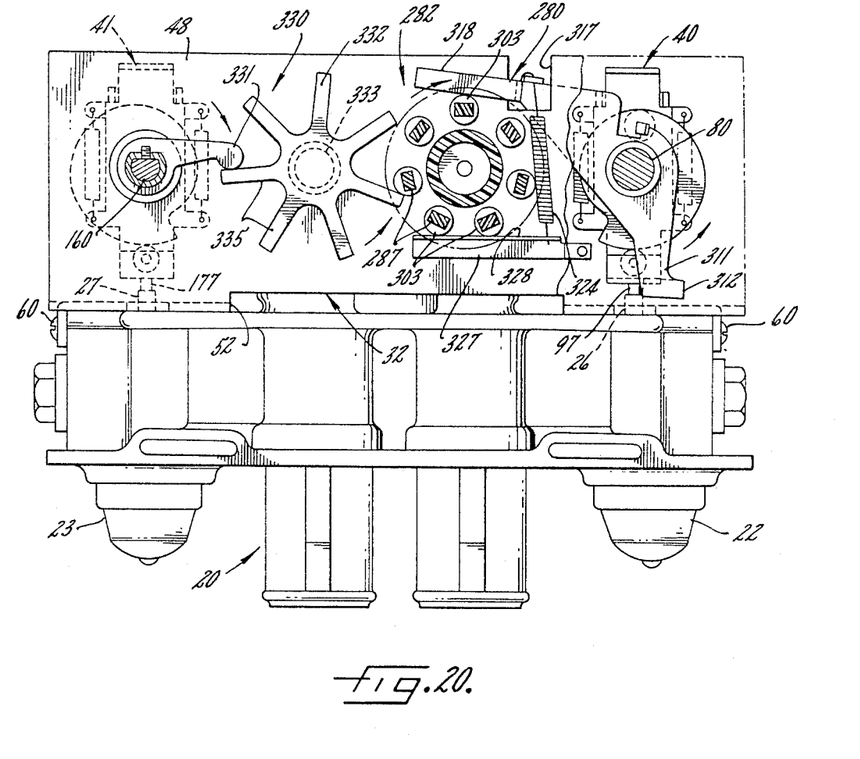
FIGURE 20 is a sectional view taken along line 20—20 of FIGURE 3.

Referring generally to FIGURES 3, 19, and 20, the time and day set assembly 43 prevents opening of the drain valve 22 by the drain valve actuator assembly 40 except on a prescribed day or days, by preventing the actuator plate pin 97 from moving down and forcing the drain valve pin 26 down. This is effected through cooperation between a generally L-shaped skip lever 280, pivotally mounted on the drain shaft 80, and a day set disc unit 282. The skip lever 280 blocks downward movement of the actuator plate 95, except on pre-selected days, as dictated by the setting of the disc unit 282.

Referring now specifically to FIGURES 3 and 14–20, the day set disc unit 282 comprises a circular disc 285 mounted for rotation on a stub shaft 286 appropriately secured to the front wall 48 of the chassis 32. The disc 285 carries seven day pins 287 mounted for two position sliding movement in passages 288 extending transversely through the disc to 285 and evenly spaced around its periphery. The day pins each represent a day of the week and are identified as such in FIGURE 14.

Figure 17:
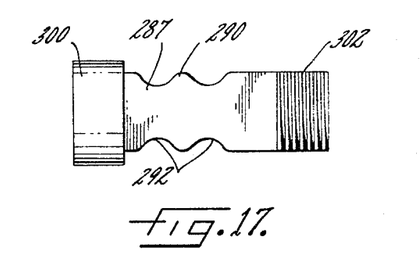
FIGURE 17 is an enlarged side-elevational view of a day set pin for the day set dial.
Figure 18:
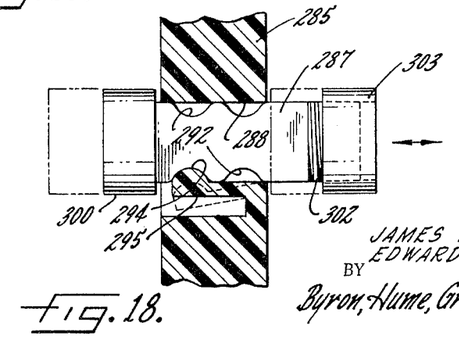
FIGURE 18 is an enlarged sectional view of a day set pin seated in the day set dial.

Each day pin 287 comprises a generally rectangular central section 290 which is adapted to slide in the rectangular cross sectioned corresponding passage 288 in the disc 285. A spaced pair of notches 292 are formed on each of two sides of the pin 282 and one pair of these notches 292 cooperates with a nib 294 formed on a resilient finger 295 within a corresponding passage 288 to hold the pin 282 in either of a first forwardmost position or a second rearwardmost position. The disc 285 is preferably formed of polyethylene or polypropylene plastic or the like and, accordingly, the finger 295 is inherently resilient.

A generally circular head 300 is formed on the front end of each pin 287 and the pin is threaded at its rear end, as at 302, to receive an internally threaded circular head 303 (see FIGURE 19). Each of the pins 287 can be moved from the first position, wherein the head 303 of the pin extends only a short distance outwardly of the back of the disc 285, to the second position, wherein the head 303 extends a substantial distance rearwardly of the disc 285.

The skip lever 280 includes an arm 310 extending into cooperative engagement with the day set disc unit 282 and another arm 311 extending toward the drain valve actuator assembly 40. A foot 312 extends laterally of the downwardly extending arm 311 and is adapted to move from a position under the actuator plate 95, in its line of travel, to a position free of the line of travel of the plate 95, and vice versa, as it is pivoted around the drain shaft 80.

The arm 310 has an off-set 316 therein, as will be noted, which extends through a notch 317 formed in the front wall 48 of the chassis 32. The outer end 318 of the arm 311 rests on the uppermost of the day pins 287 when the corresponding uppermost pin is in its first position, and falls free of the pin 287 when the uppermost pin is in its second position. Accordingly, it will be seen that when the uppermost pin 287 is in its first position, the skip lever 280 cannot pivot out from under the actuator plate 95 and, conversely, when the uppermost pin 287 is in its second position, the lever can readily pivot out from under the actuator plate 95.

The skip lever 280 is biased in a counter-clockwise direction about the drain shaft 80 by a coil spring 324 disposed between an ear 325 on the arm 311 and a stabilizing lever 326 pivotally mounted on the front wall 48 of the chassis 32, as at 327. The stabilizing lever 326 has a flat upper surface 328 which is adapted to ride on the two lowermost day pins 287 and tend to fix the position of the disc 285 so as to hold the uppermost pin 287 in its correct position at all times, regardless of the day pin 287 which is uppermost. The lever 326 bears against the rear head 303 of appropriate day pins 287 regardless of whether the pins are in their first or second positions.

Each 24-hour cycle requires the movement of a new day pin into operative position at the top of the disc 285, of course, to control the position of the skip lever 280 for the succeeding 24 hours. Accordingly, as seen in FIGURE 20, a day tripper assembly 330 interconnects the day set disc unit 282 with the rinse valve shaft 160 to rotate the disc 285 on its mounting at a predetermined time between operations of the drain valve actuator assembly 40 and the rinse valve actuator assembly 41.

The day tripper assembly 330 comprises a tripper arm 331 fixed on the rinse shaft 160 for rotation therewith. As the arm 331 rotates with the shaft 160, it cooperates with a cog wheel 332 journaled on a stub shaft 333 suitably mounted on the front wall 48 of the chassis 32. The cog wheel 332 in turn cooperates with the rear heads 303 of appropriately positioned day pins 287 whether they are in their aforementioned first or second positions, to rotate the disc 285 and move the next day pin 287 into its operative, uppermost position. A 360° rotation of the rinse shaft 160 and arm 331 advances the disc 285 "one day."

The tripper arm 331 extends radially from the shaft 160 in predetermined angular relationship with the leading edge 146 of the cutout 145 in the drain valve actuator cam 95. It is so positioned that it induces the cog wheel 332 to rotate the day disc 285 approximately two hours before the drain valve actuator assembly 40 opens the drain valve 22 and initiates regeneration. The cog wheel 332 has seven radially extending teeth 335, one of which is engaged by the day tripper arm 331 at such time causing the cog wheel 332 to rotate through approximately 51.4° as the day tripper lever 331 passes. The teeth 335 meshing with corresponding day pins 287 in the day disc 285 to effect rotation thereof.

It will now be seen that during each 24-hour period, over a series of seven such 24-hour periods, a predetermined day set pin 287 is in operative, or uppermost, position relative to the front wall 48 of the chassis 32. By pulling the day pin 287 out or pushing it in, the drain valve actuator assembly 40 is appropriately made operative for any one, several, or all of the seven successive 24-hour periods. It is now only necessary to coordinate the 24-hour periods with 24-hour calendar days to put the unit 12 in phase with sun time and, subsequently to select and set a desired time during any one day for regeneration.

The control unit 21 constructed in accordance with the present invention facilitates setting the regeneration system 12 for regeneration and backwash at any given time on any given day or days of the week, as has been pointed out. To set the pre-selected regeneration time, a time-set sub-assembly 340 is provided on the front end 164 of the rinse shaft 160.

The time set sub-assembly 340 includes a regeneration knob 341 which is fixed to the front end 164 of the rinse shaft 160 for rotation therewith by a set screw 341a. The knob 341 seats within a time dial 342 indicia illustrating an annular face 343 imprinted thereon. The face 343 preferably includes a black semi-circle 343a numbered from 6 p.m. to 6 a.m. and a white semi-circle 343b numbered from 6 a.m. to 6 p.m.; thus graphically depicting the day-time period and the night time period. The time dial 342 is rotatably mounted on the shaft 160, but a spring washer 344 biases it against the regeneration knob 341 so that the two will tend to turn together. To complete the time set sub-assembly 340, a mark 345 is provided on the front wall 48 of the chassis 32 (see FIGURE 2) to indicates the position of the leading edge 146 in the cutout 145 of the drain valve actuator cam 92 at 12 p.m., and a protective cover 346 is provided on the regeneration knob 341. The cover 346 carries an arrow aligned with the knob 341.

An understanding of the manner in which time and day set is accomplished is the most effective manner of explaining the mechanics of the time set sub-assembly 340. First, the energization unit plate 260 is pushed inwardly and held to force the clutch shaft 251 rearwardly and dis-engage the drive motor 241 from the gear train 240. This permits the drain shaft 80 and the rinse shaft 160 to be rotated freely, although in phase. While the motor 241 is dis-engaged from the gear train 240, the day disc 285 is turned until a correct day pin 287 is in the uppermost or operative position. The stabilizing lever 328 is effective to hold the disc 285 as it is appropriately pre-positioned.

The regeneration knob 341 is then turned until the arrow 350 on the regeneration knob cover 346 is aligned with the desired time of day for regeneration to start on the face 343 of the time dial 342. The arrow is in precise angular alignment with the leading edge 146 of the cutout 145 in the drain valve actuator cam 92. Accordingly, it will be understood that when the arrow 350 points directly upward as the drain shaft 80 and rinse shaft 160 rotate, the leading edge 145 will have just reached the cam roller 113 and the actuator assembly 40 will open the drain valve 22 to initiate regeneration.

When the arrow 350 is pointed toward the selected hour of the day or night for regeneration, the regeneration knob 341 and time dial 343 are turned together until the correct sun time indicia on the face 343 is in alignment with the mark 344 on the face plate 36 of the housing 33. The control device 21 is now set to initiate regeneration of the system 12 according to the predetermined schedule. It might be pointed out here that any ratchet arrangement (not shown) might be provided to cooperate with one of the spur gears 242, 243 and permit rotation thereof only in one direction.

As the time and day set assembly 43 is manipulated to appropriately set the time and day or days for recharge and backwash, it will be seen that any time the cutout 145 in the actuator cam 92 of the drain valve actuator assembly 40 passes under the cam roller 101 the system 12 will theoretically be thrown into regeneration. Usually this is not a desirable result of the time and day set operation and, accordingly, punching of the de-energization plate unit 260 to facilitate time and day set is also effective to dis-arm or prevent energization of the drain valve 22 as long as the plate unit 260 is held inwardly.

Figure 5:
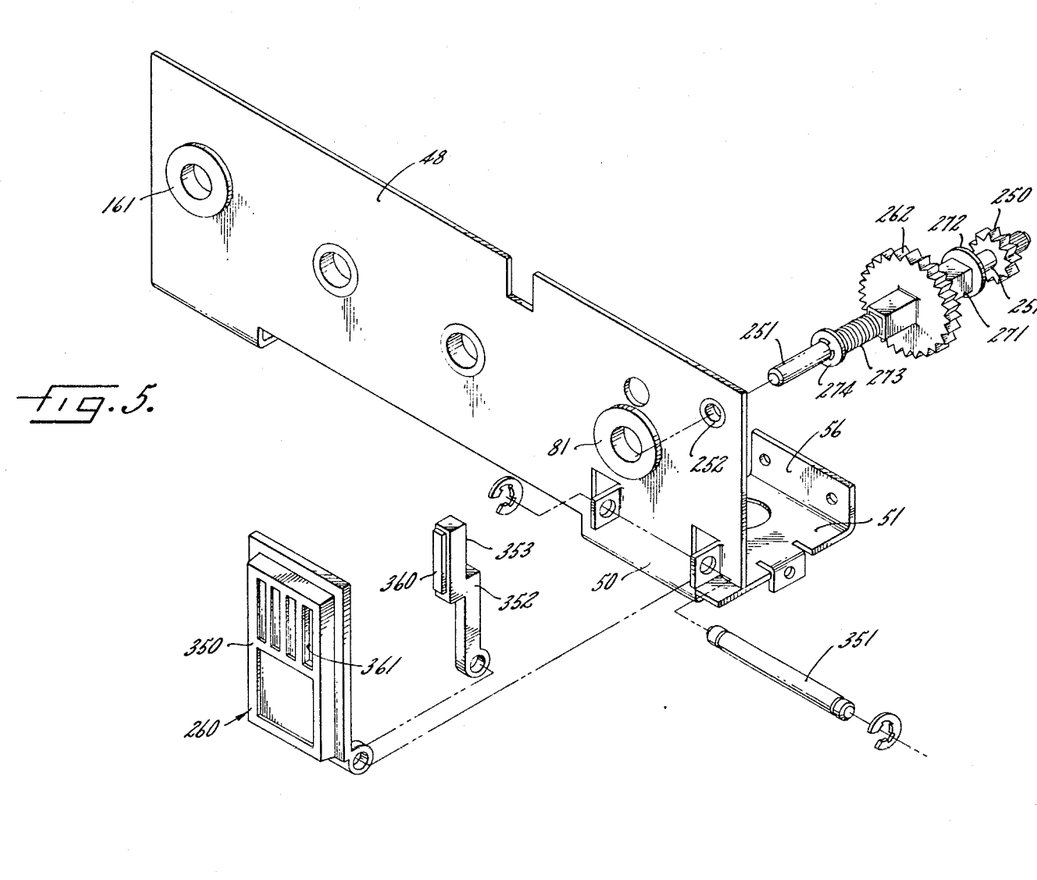
FIGURE 5 is an enlarged exploded perspective view of a portion of the timing device including the disengaging plate unit.
Figure 6:
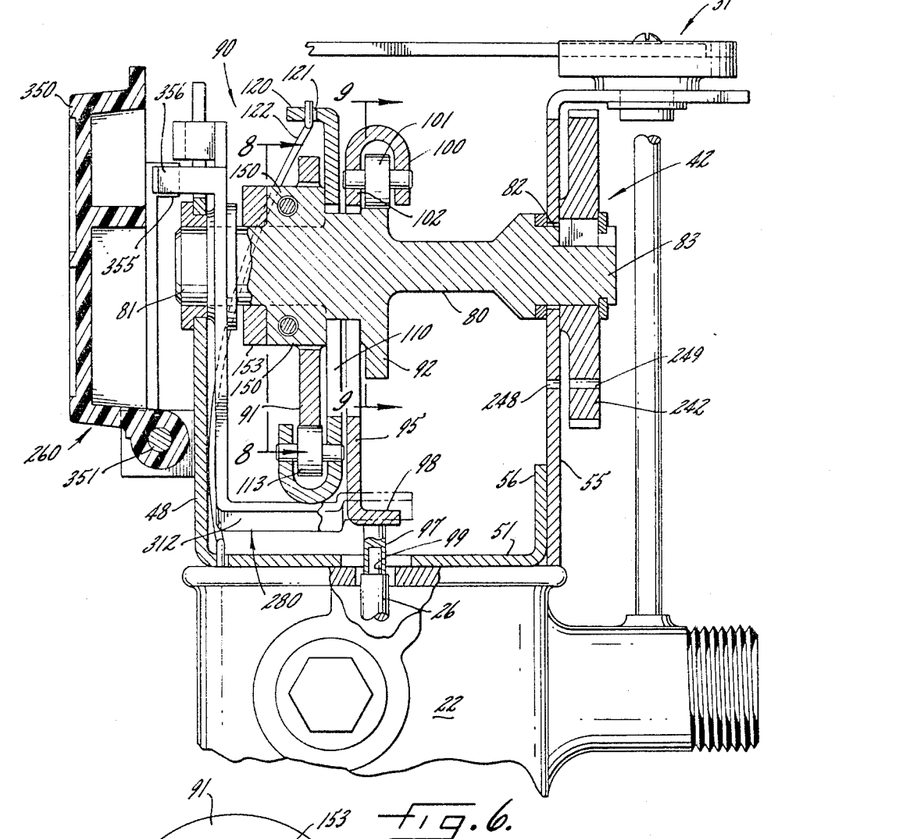
FIGURE 6 is a sectional view taken along line 6—6 of FIGURE 3.

Referring now to FIGURES 4–6, the de-energization plate unit 260 includes a recessed rectangular plate 350 pivotly mounted on a shaft 351 journaled on the front wall 48 of the chassis 32. A finger bar 352 is pivoted on the shaft 351 within the confines of the plate 350 and has a rear engagement surface 353 thereon for cooperating with the clutch shaft 251 to force the clutch shaft 251 rearwardly when the plate 350 is pivoted toward the front wall 48, moving the finger 352 with it. As the plate 350 and finger 352 pivot toward the front wall 48 a cam surface 355 (see FIGURE 3) on the plate 350 cooperates with a cam surface 356 extending forwardly of the skip lever 280 through an aperture to rotate the skip lever 280 in a clockwise direction and move the foot 312 of the skip lever under the actuator plate 95 and prevent actuation of the drain valve 22 by the drain valve actuator assembly 40. It will thus be seen that as long as the plate 350 itself is held inwardly toward the front wall 48 of the chassis 32, the regeneration system 12 cannot be thrown into regeneration.

At the same time, if it is desirable to initiate regeneration indiscriminately, a trained service man is able to push the finger 352 rearwardly by engaging its front face 360 through an appropriately shaped aperture 361 in the plate 350. The finger 352 forces the clutch shaft 251 rearwardly to disengage the motor 241 from the gear train 240. The main plate 350 does not move toward the front wall 48 of the chassis 32 under these conditions and, accordingly, the cam surfaces 355 and 356 do not cooperate to move the skip lever 280 in a clockwise direction. As a result the actuator plate 95 of the drain valve actuator assembly 40 is free to open the drain valve 22 as the drain shaft 80 is rotated by turning the regeneration knob 341. Regeneration is initiated of course, when the leading edge 146 of the cutout 145 formed in the actuator cam 92 of the drain valve actuator assembly 40 is reached by the cam roller 101 during such rotation.

The control unit 21 has been discussed solely in terms of initiating and controlling regeneration inclusive of recharge and backwash. It should be recognized, however, that it might be adapted to control additional rinse cycles, for example, if desired, both before and after recharge. In addition, although suggested time periods for recharge and backwash are given here, they might be varied considerably.

Although a preferred embodiment of this invention has been shown and described it will be understood that various other embodiments, modifications and improvements might fall within the scope of the invention. Consequently, it is intended that the invention be limited only by the appended claims.

What is desired to be claimed and secured by Letters Patent of the United States is:

1. A timing device for controlling the operation of responsive means according to a pre-determined schedule, comprising: shaft means rotated by motor means at a pre-determined speed, operator means mounted on said shaft means for movement transversely thereof to operate the responsive means, cam means on said shaft means for cooperating with said operator means to initially energize said operator means for operation of the responsive means and to subsequently permit said operation at a pre-determined time, and resilient means for biasing said operator means out of operating relationship with the responsive means.

2. The timing device of claim 1 further characterized by and including means for selectively preventing said operator means from operating the responsive means at said predetermined time.

3. A timing device for controlling operation of responsive means according to a predetermined schedule, comprising; shaft means rotated by motor means at a predetermined speed, actuator means mounted on said shaft means for movement transversely thereof to operate the responsive means, actuator cam means on said shaft means for cooperating with said actuator means to retain said actuator means out of operative relationship with said responsive means until a predetermined time is reached, energizer means mounted on said shaft means for movement transversely thereof adjacent said actuator means, resilient means connecting said actuator means and said energizer means, and energizer cam means on said shaft means for cooperating with said energizer means to force it apart from said actuator means and build up energy in said resilient means so as to precondition said actuator means for said transverse movement to operate the responsive means when said actuator cam means permits said transverse movement of said actuator means at said predetermined time.

4. The timing device of claim 3 further characterized by and including other resilient means constantly urging said energizer means against the influence of said energizer cam means, drop-off means on said energizer cam means and a cam follower on said energizer means, said other resilient means moving said energizer means and, accordingly, said actuator means transversely of said shaft to remove said actuator means from operative relationship with the responsive means when said cam follower reaches said drop-off means after a predetermined period of time has elapsed from said predetermined time.

5. The timing device of claim 4 further characterized in that said motor means rotates said shaft means at a constant speed of one revolution every 24 hours.

6. The timing device of claim 4 further characterized by and including means for selectively preventing movement of said actuator means into operative relationship with the responsive means.

7. The timing device of claim 4 further characterized in that said energizer cam means is angularly adjustable on said shaft to vary the length of said predetermined period of time.

8. A device for controlling a sequence of operations in responsive means according to a predetermined schedule, comprising; a chassis, first shaft means mounted in said chassis and rotated by motor means at a predetermined speed, first means mounted on said first shaft means for movement transversely thereof to operate a first of said responsive means, cam means on said first shaft means for cooperating with said first operator means to retain said first operator means out of operating relationship with the first responsive means until a predetermined time is reached, cam means on said first shaft means for releasing said first operator means at said predetermined time, second shaft means mounted in said chassis means and connected to said first shaft means for rotation in phase therewith, second means mounted on said second shaft means for movement transversely thereof to operate a second of responsive means, cam means on said second shaft means for cooperating with said second operator means to retain said second operator means out of operating relationship with second responsive means until a second predetermined time is reached, and cam means on said second shaft means for releasing said second operator means at said second predetermined time.

9. The timing device of claim 8 further characterized by and including means for selectively preventing said first operator means from operating the respective responsive means at said first predetermined time.

10. The timing device of claim 8 further characterized by and including means for disengaging said motor means from said first and second shaft means to permit rotation of said first and second shaft means independent of said motor means to pre-set said predetermined time according to actual time.

11. In a water conditioning system including a valve arrangement having a drain valve and a rinse valve for controlling service water flow and regeneration, a timing device for operating the drain valve and rinse valve according to a predetermined schedule to sequence normal service softening and regeneration comprising; a chassis, a drain shaft mounted in said chassis for rotation by a motor means at a predetermined constant speed, an actuator plate mounted on said drain shaft for movement transversely thereof to actuate the drain valve, an actuator cam on said drain shaft for cooperating with said actuator plate to retain said actuator plate out of operative relationship with said drain valve until, a predetermined time is reached, energizer means for building up energy as said shaft rotates before said predetermined time is reached to operate the drain valve and rinse valve actuator means operatively connected to said drain shaft for actuating said rinse valve when a succeeding predetermined time is reached.

12. The timing device of claim 11 further characterized by and including moveable stop-means for selectively preventing said actuator plate from operating the drain valve during any predetermined twenty-four hour period.

13. The timing device of claim 11 further characterized by and including resilient means connected to said actuator plate for biasing said actuator plate away from operative relationship with the drain valve.

14. In a water conditioning system including a valve arrangement having a drain valve and a rinse valve for controlling service water flow and regeneration, a timing device for operating the drain valve and rinse valve according to a predetermined schedule to sequence normal service softening and regeneration, comprising; a chassis, a drain shaft mounted in said chassis and rotated by a motor at a predetermined speed, and actuator plate mounted on said drain shaft for movement transversely thereof to actuate the drain valve, an actuator cam on said shaft for cooperating with said actuator plate to retain said actuator plate out of operative relationship with the drain valve until a predetermined time is reached, an energizer plate mounted on said shaft for movement transversely thereof adjacent said actuator plate, resilient means connecting said plates, an energizer cam on said shaft for cooperating with said energizer plate to force said plates apart and build up energy in said resilient means so as to pre-condition said actuator plate for said transverse movement to actuate the drain valve when said actuator cam permits said transverse movement of said actuator plate at said predetermined time, and rinse valve operator means for actuating the rinse valve at another predetermined time, said rinse valve operator means including a rinse shaft rotatably mounted in said chassis, said rinse shaft being connected by a gear train to said drain shaft whereby said rinse shaft rotates in a prescribed relationship with said drain shaft to sequence said predetermined times.

15. The timing device of claim 14 further characterized by and including other resilient means constantly urging said energizer plate against the influence of said energizer cam, drop-off means on said energizer cam and a cam follower on said energizer plate, said other resilient means moving said energizer plate and, accordingly, said actuator plate transversely of said drain shaft to remove said actuator plate from operative relationship with the drain valve when said cam follower reaches said drop-off after a predetermined period of time has elapsed from said one predetermined time.

16. The timing device of claim 14 further characterized by and including stop means for selecting preventing said actuator plate from operating the drain valve at said one predetermined time.

17. The timing device of claim 15 further characterized in that said energizer cam is angularly adjustable on said drain shaft to vary the length of said predetermined period of time.

18. In a water conditioning system including a valve arrangement having a drain valve and a rinse valve for controlling service water flow and regeneration, a timing device for operating the drain valve and rinse valve according to a predetermined schedule to sequence normal service softening and regeneration, comprising; a chassis, a drain shaft mounted in said chassis and rotated by a motor at a predetermined speed, a drain valve actuator plate mounted on said drain shaft for movement transversely thereof to actuate the drain valve, a drain valve actuator cam on said drain shaft for cooperating with said drain valve actuator plate to retain said drain valve actuator plate out of operative relationship with the drain valve until a predetermined time is reached, energizer means for building up energy as said shaft rotates before said predetermined time is reached to operate the drain valve a rinse shaft mounted in said chassis and connected to said drain shaft for rotation in phase therewith, a rinse valve actuator plate mounted on said rinse shaft for movement transversely thereof to actuate the rinse valve, and a rinse valve actuator cam on said rinse shaft for cooperating with said rinse valve actuator plate to retain said rinse valve actuator plate out of operative relationship with the rinse valve until a second predetermined time is reached, energizer means for building up energy as said rinse shaft rotates before said predetermined time is reached to operate the rinse valve.

19. The timing device of claim 18 further characterized by and including means for disengaging said motor from said drain shaft and said rinse shaft to permit rotation of said shafts independent of said motor to pre-set said predetermined times according to actual time.

20. The timing device of claim 18 further characterized by and including stop means for selectively preventing movement of said drain actuator plate into operative relationship with the drain valve.

21. The timing device of claim 20 further characterized in that said stop means is normally actuated by said disengaging means, said disengaging means including alternative means for disengaging said motor from said shafts without actuating said stop means to facilitate manual initiation of regeneration.

22. The timing device of claim 20 further characterized in that said stop means is operatively connected to said rinse shaft for control by the rotation of said rinse shaft.

References Cited by the Examiner

UNITED STATES PATENTS

| | | |
|---|---|---|
| 514,736 | 2/1894 | Sloan. |
| 544,380 | 8/1895 | Roberts _______________ 74—55 |
| 2,398,875 | 4/1946 | Zahodiakin ____________ 74—55 |
| 2,558,679 | 6/1951 | Gressel et al. _______ 74—569 X |
| 2,935,878 | 5/1960 | Wirsching _____________ 74—55 |

MILTON KAUFMAN, *Primary Examiner*.